Patented Dec. 4, 1934

1,982,909

UNITED STATES PATENT OFFICE 1,982,909

INSECTICIDE COMPOSITION AND METHOD FOR ITS APPLICATION

Wesley P. Flint and George L. Hockenyos, Urbana, Ill., assignors, by mesne assignments, to Monsanto Chemical Company, a corporation of Delaware No Drawing. Application December 6, 1929, Serial No. 412,278

14 Claims. (Cl. 167—22)

This invention relates to insecticides and the manner of their use and it has particular application to the extermination of worms and insects which dwell in the ground or places which are accessable only with difficulty.

The principal object of this invention is to provide a means for increasing the effective toxic range of any given toxic agent. It is a recognized fact that although many toxic agents are known which are capable of exterminating various worms and insects their effectiveness and value is limited by the fact that the toxic zone is relatively small and the insect to be exterminated is not reached easily by the agent. The most common way of applying a toxic agent is to spray or dust the same on the surface of the infested area. In many instances this treatment is ineffective since the insect or worm retreats from the zone of toxicity to a greater depth and thereby avoids extermination. To meet this condition it is customary to apply a relatively large amount of the toxic agent in order that the effective range of its toxicity will be increased sufficiently. While in a few instances this is successful it is apparent that such use of the toxic agent is wasteful and expensive.

According to the present invention we employ a toxic agent in combination with an agent which is capable of forcing the worm or insect to penetrate the toxic zone. In other words by our invention we employ a relatively small amount of the toxic agent and compel the pest to enter the zone of toxicity. The materials which we employ for this purpose are herein designated as irritants. In general they have an irritating property on the pest which drives it to the surface of the ground where it comes in contact with the toxic agent.

In this way we are able to limit the amount of the toxic agent employed, while at the same time we are able to extend, very materially, the effective toxic zone of the particular agent in question.

The toxic agent which is to be employed depends, of course, in each instance, upon the pest to be exterminated. Thus for example some insecticides function satisfactorily in the extermination of one insect or worm whereas another insecticide functions more satisfactorily for some other insect or pest. The selection of the particular toxic agent in each instance is therefor dependent upon the pest which is to be eradicated.

The irritant is preferably a material which is water soluble or which may be dispersed in an aqueous medium readily. Examples of materials which may be employed are monochloracetic acid, monochloroacetone, bichloride of mercury, dinitrobenzaldehyde, and others. A composition which gives especially good results is mustard oil, it being water soluble and having marked irritating properties even in very dilute solutions. Characteristic toxic agents include mono chlornaphthalene, the alkali fluorides, and fluosilicates, the sodium salts of which are well suited and dichlorobenzenes, the liquid ortho derivatives being well suited for this purpose.

In some instances it is advantageous to mix the irritant and toxic agents together. It should be noted however that this is not essential and that the irritant and toxic agent may be applied to the surface of the ground at different times. We have employed a solvent medium, such as coal oil, for the irritant and toxic agent to advantage. Coal oil is particularly suited since it is relatively inexpensive and at the same time is itself a very satisfactory toxic agent. A preferred embodiment of my invention consists in mixing 100 parts of mono chlornaphthalene in 400 parts of coal oil, to which there is added 20 parts of mustard oil. The resulting mixture is emulsified in 100 parts of water by means of potassium fish oil soap, 35 parts being sufficient for this purpose. The emulsion so produced is mixed with enough water to produce an approximately ½% emulsion and is thereafter applied to the surface of the ground. For golf greens of about 400 square yards area, 250 to 300 gallons of the aqueous mixture have been found sufficient to eradicate the ordinary large European earthworm.

The mono chlornaphthalene is an effective toxic agent against European earthworm but the zone of toxicity is relatively small. Moreover in the presence of mono chlornaphthalene the earthworm crawls to a greater depth and remains there until the siege is ended. On the other hand the mustard oil, which when so diluted, has no substantial toxic value, penetrates the interstices of the soil beyond the toxic zone of the mono chlornaphthalene, causes the earthworm to rise to the surface of the ground where it enters the zone of mono chlornaphthalene toxicity and is exterminated.

It is interesting to note that the toxicity of the mono chlornaphthalene is not increased substantially by the presence of the mustard oil, in fact in the amounts employed the mustard oil is probably non-toxic. On the other hand, when mono chlornaphthalene is employed without the irritant the mono chlornaphthalene-coal oil mixture fails to exterminate the worms which are able to travel downwardly to a depth beyond the toxic range of the mixture.

Although we have described but a single embodiment of the principles of the invention in detail it will be apparent that other toxic agents may be employed and that other irritants may be substituted for those herein above set forth. It will likewise be apparent that the nature of the toxic agent is dependent to a large extent on the insect to be eradicated. The principles of the invention, that is the use of an irritating agent, which is capable of compelling the insect upwardly to the earth's surface, together with a toxic agent which is effective near the surface of the ground only, are universally applicable. By practising the invention one is enabled, not only to make more efficient use of any toxic agents but the principles enable one to employ effectively insecticides which, by reason of their expense, have not been practicable heretofore. These, together with many other advantages, are readily apparent from the description of our invention here and above set forth.

In this application we have employed the terms—insect, pest and worm not in the strictly scientific sense, but in a generic sense to designate an object sought to be eradicated.

What we claim is:

1. The method of exterminating insects, including worms and pests, such as commonly infest cultivated soil areas that comprises applying a toxic agent to the surface of the cultivated area thereby producing a toxic zone and causing the insect to travel upwardly to the surface of the treated area by means of a chemical irritating agent similarly applied, which of itself has no substantial toxic effect.

2. The method of exterminating insects including the earthworms, which comprises applying a toxic agent to the surface of an infested soil area thereby producing a toxic zone and causing the insect to travel upwardly to the surface of the treated area by applying in a similar manner an agent which has no substantial toxic properties under the conditions by itself but which is capable of irritating the insect and compelling it to penetrate the toxic zone.

3. The method of exterminating earth-burrowing insects which comprises applying to the surface of the soil area infested by the insects at least one halogenacious material selected from a group consisting of the following toxic materials: mono chlornaphthalene, sodium fluoride, sodium fluosilicate, dichlorbenzene, thereby producing a toxic zone and causing the earthworm to penetrate the toxic zone by means of a chlorous material similarly applied and selected from the following group: monochloracetic acid, monocchloracetone and bichloride of mercury, both the irritant and the toxic material being substantially non-toxic at material depths below the surface of the soil.

4. The method of exterminating earth-burrowing insects which comprises applying to the surface of the soil area infested by the insects at least one halogenacious material selected from a group consisting of the following toxic materials: mono chlornaphthalene, sodium fluoride, sodium fluosilicate, dichlorobenzene, thereby producing a toxic zone and causing the earthworm to penetrate the toxic zone by means of a chemical similarly applied and consisting of mustard oil.

5. The method of exterminating earth-burrowing insects which comprises applying to the surface of the soil area infested by the insects at least one halogenacious material selected from a group consisting of the following toxic materials: mono chlornaphthalene, sodium fluoride, sodium fluosilicate, dichlorobenzene, thereby producing a toxic zone and causing the earthworm to penetrate the toxic zone by means of a chemical similarly applied and consisting of dinitrobenzaldehyde.

6. The method of exterminating earthworms that comprises applying a toxic agent uniformly to the surface of the soil area to be treated thereby producing a toxic zone for the worms and compelling the worms to travel from beneath the earth's surface upwardly into the toxic zone by means of a chemical irritant, such irritant being similarly applied and capable of dissolution or dispersion in a water medium.

7. The method of exterminating earthworms that comprises applying mono chlornaphthalene and mustard oil to the surface of a worm infested soil area.

8. An insecticide for eradication of earthworms, a water dispersible emulsion containing a toxic agent and a material having relatively little toxic value, but having substantial irritating effect and capable of penetrating the surface of the earth to a substantially greater extent than the effective range of the toxic agent.

9. An insecticide for eradication of earthworms consisting of a toxic agent and an irritating material which is water soluble or may be dispersed in an aqueous medium, said material having relatively little toxic value and capable of penetrating the ground to a greater depth than the effective toxic range of the toxic agent.

10. An insecticide composition for treating of soil areas infested with insects, worms or pests which comprises a water dispersible emulsion consisting of an emulsifying agent, a toxic agent and an irritant.

11. An insecticide as defined in claim 10 and further characterized in that the emulsifying agent consists of a water soluble soap.

12. An insecticide as defined in claim 10 and further characterized in that the relative proportion of the irritant as compared to the toxic agent is such that under the conditions of its use the irritating agent has substantially no toxic value.

13. The method of exterminating worms and insects which remain beneath the surface of the earth a large proportion of the time that comprises applying to the surface of the infested earth area an aqueous dispersion of an emulsion containing a toxic agent and an irritant.

14. The method as defined in claim 13 and further characterized in that an emulsifying agent consisting of a soluble soap is employed.

WESLEY P. FLINT.
GEORGE L. HOCKENYOS.